United States Patent
Tanabe et al.

(10) Patent No.: US 6,747,756 B1
(45) Date of Patent: Jun. 8, 2004

(54) COLOR PRINTING APPARATUS

(75) Inventors: Kenichi Tanabe, Tokyo (JP); Hiroshi Ono, Tokyo (JP); Yoshiharu Konishi, Suwa (JP); Hitoshi Hayama, Suwa (JP)

(73) Assignees: King Jim Co., Ltd. (JP); Seiko Epson Corporation (JP)

( * ) Notice: Subject to any disclaimer, the term of this patent is extended or adjusted under 35 U.S.C. 154(b) by 0 days.

(21) Appl. No.: 09/475,210

(22) Filed: Dec. 29, 1999

(30) Foreign Application Priority Data

Jan. 13, 1999 (JP) .......................... 11-006218

(51) Int. Cl.⁷ .......................... H04N 1/46; G06K 15/00
(52) U.S. Cl. .......................... 358/1.16; 358/1.9; 358/3; 358/530; 358/523
(58) Field of Search .................. 358/1.9, 2.1, 1.16, 358/1.17, 3.23, 500, 504, 518, 523, 530; 352/167

(56) References Cited

U.S. PATENT DOCUMENTS 5,809,213 A * 9/1998 Bhattacharjya ............. 395/106
6,504,625 B1 * 1/2003 Amero ....................... 358/1.9

FOREIGN PATENT DOCUMENTS

| JP | 5-128115 | 5/1993 | G06F/15/20 |
| JP | 9-48158 | 2/1997 | G06F/15/20 |
| JP | 9-207387 | 8/1997 | B41J/2/525 |
| JP | 9-290537 | 11/1997 | G06F/3/12 |
| JP | 11-237947 | 8/1999 | G06F/3/02 |

* cited by examiner

Primary Examiner—Jerome Grant, II
(74) Attorney, Agent, or Firm—Lorusso, Loud & Kelly

(57) ABSTRACT

There is provided a color printing apparatus capable of easily and rapidly setting the color for each of edited items relating to color without lowering the degree of freedom of setting even if there are a large number of selectable edited items relating to color.

The color printing apparatus has previously stored a plurality of sets of combinations of set values for a plurality of edited items relating to the color of the printed image, allows a user to select any one of the combinations of set values, and stores the set values of the selected combination along with the printed image so that the stored set values are rewritable by separately setting the edited items relating to the color of the printed image. Alternatively, the color-printing apparatus allows a user to form input a character string in accordance with a selected use, has stored a combination of set values for a plurality of edited items relating to the color of the printed image for the selected use, with respect to a plurality of uses relating to a form input, and stores the set values for a plurality of edited items relating to the color of the printed image for the selected use, along with the printed image so that the stored set values are rewritable by separately setting a part or all of the edited items relating to the color of the printed image.

5 Claims, 12 Drawing Sheets

FIG.11

| Identification Name | Background Color | Ground Tint Color | Closing Line Color | Intraframe Color | Character Color | Outline Color | Character Shadow Color | Enclosing Line Color | Intra-Enclosure Color | Half-Tone Dot Meshing Color |
|---|---|---|---|---|---|---|---|---|---|---|
| Warning | Yellow | Black | Black | Yellow | Black | Black | Black | Black | Yellow | Black |
| Active | Red | Yellow | Yellow | Blue | Yellow | Yellow | Yellow | Yellow | Red | Yellow |
| Casual | Green | White | White | Red | White | White | White | White | Green | White |
| ----- | ----- | ----- | ----- | ----- | ----- | ----- | ----- | ----- | ----- | ----- |
| Monotone | Black | White | White | Glay | White | White | White | White | Black | White |

COLOR PRINTING APPARATUS

BACKGROUND OF THE INVENTION

1. Field of the Invention

The present invention relates generally to a color printing apparatus, which can be applied to, e.g., a tape printing apparatus or a word processor, for color-printing a printed image of a character image, which is superposed on a background image and which comprises a character string of letters, symbols and the like (the character string being the arrangement of a plurality of characters and including the case of a single character).

2. Description of Conventional Art

In a tape printing apparatus for printing an inputted character string on a tape, in a case where the background of the character string is colored (a background color) or the character string itself is colored (a character color) to be printed, a user selects a desired color from various selectable background colors and character colors.

That is, the user must always set the background color and character color in order to carry out color print, so that the user's operation load is great.

In a method for eliminating such inconvenience, there is a method described in Japanese Patent Laid-Open No. 9-48158. In this method, when a background color selecting screen is displayed during a print command, if any one of background color options is selected, a character color matched to the selected background color is automatically selected to print an image. The user has only to carry out the operation for selecting the background color.

However, in the above described conventional method, since the selection of the combination of the background color with the character color is carried out after the print command, the timing in designating the combination of the background color with the character color is restricted, so that there is a problem in that this is not so easy to handle. That is, if the user wish to print an image having any color scheme before the input of a character string, there is a problem in that it is not possible to designate the colors in that timing.

In addition, in the above described conventional method, there is a problem in that it is not possible to change one of the background color and character color designated by the combination, since the selection of the combination of the background color with the character color is carried out after the print command.

By the way, the color items capable of being optionally selected by the user are preferably various items without being limited to the background color and character color. For example, it is preferably possible to designate a ground tint color defining the color of a ground tint, a closing-line color and an intraframe color when a character string has a closing line, a character shadow color when a character has a shadow, an enclosing line color and an intra-enclosure color when a character has an enclosing line, and a half-tone dot meshing color when a character has a half-tone dot meshing.

In this case, according to the conventional method, it is considered that after a print command, a background color is selected to automatically set colors for all of other color items to print an image. However, also in this case, as described above, there is a problem in that it is not possible to change the color(s) for part of the color items designated by the combination of colors. This problem is serious since the determination of the color for each of the color items is finally put into user's hands. In this case, a method for individually designating each of color items may be applied. However, this is not so easy to handle since the number of operations is very great.

Moreover, according to the conventional method, there is a problem in that a background color must be designated every print command even in a case where the same printed image is printed after time passes.

SUMMARY OF THE INVENTION

It is therefore an object of the present invention to eliminate the aforementioned problems and to provide a color printing apparatus capable of easily and rapidly setting the color for each of color items without lowering the degree of freedom of setting even if the number of selectable color items (edited items for color) is great.

In order to accomplish the aforementioned and other objects, according to a first aspect of the present invention, there is provided a color printing apparatus for printing a printed image of a composite image comprising a color-printable background image and a color-printable character image superposed on the background image, the color printing apparatus comprising: color-set storing means previously having stored a plurality of sets of combinations of set values for a plurality of edited items relating to the color of the printed image; and automatic color-set setting means for allowing a user to select any one of the combinations of set values, and for storing the set values of the selected combination along with the printed image so that the stored set values are rewritable by separately setting the edited items relating to the color of the printed image.

In the color printing apparatus according to the first aspect of the present invention, the automatic color-set setting means may show names, each of which identifies a corresponding one of a plurality of sets of combinations of set values for a plurality of edited items and each of which are associated with the corresponding one, to allow the user to select any one of the combinations.

The color printing apparatus according to the first aspect of the present invention may further comprise color-set editing means for allowing the color-set storing means to newly store an additional combination of set values for the plurality of edited items relating to the color of the printed image or to delete any one of the plurality of sets of combinations of set values for the plurality of edited items relating to the color of the printed image.

As described above, according to the first aspect of the present invention, the color printing apparatus comprises: color-set storing means previously having stored a plurality of sets of combinations of set values for a plurality of edited items relating to the color of the printed image; and automatic color-set setting means for allowing a user to select any one of the combinations of set values, and for storing the set values of the selected combination along with the printed image so that the stored set values are rewritable by separately setting the edited items relating to the color of the printed image. Therefore, it is possible to provide a color printing apparatus capable of easily and rapidly setting the color for each of edited items relating to color without lowering the degree of freedom of setting even if there are a large number of selectable edited items relating to color.

According to a second aspect of the present invention, there is provided a color printing apparatus for printing a printed image of a composite image comprising a color-printable background image and a color-printable character image superposed on the background image, the color printing apparatus comprising: form inputting means for allowing a user to form input a character string in accordance with a selected use; color-set storing means having stored a combination of set values for a plurality of edited items relating to the color of the printed image for the selected use, with respect to a plurality of uses relating to a form input; and automatic color-set setting means during a form input for storing the set values for a plurality of edited items relating to the color of the printed image for the selected use, along with the printed image so that the stored set values are rewritable by separately setting a part or all of the edited items relating to the color of the printed image.

In the printing apparatus according to the second aspect of the present invention may further comprise color-set editing means for allowing the color-set storing means to newly store an additional combination of set values for the plurality of edited items relating to the color of the printed image or to delete any one of the plurality of sets of combinations of set values for the plurality of edited items relating to the color of the printed image, during the form input.

As described above, according to the second aspect of the present invention, the color printing apparatus comprises: form inputting means for allowing a user to form input a character string in accordance with a selected use; color-set storing means having stored a combination of set values for a plurality of edited items relating to the color of the printed image for the selected use, with respect to a plurality of uses relating to a form input; and automatic color-set setting means during a form input for storing the set values for a plurality of edited items relating to the color of the printed image for the selected use, along with the printed image so that the stored set values are rewritable by separately setting a part or all of the edited items relating to the color of the printed image. Therefore, it is possible to provide a color printing apparatus capable of easily and rapidly setting the color for each of edited items relating to color without lowering the degree of freedom of setting even if there are a large number of selectable edited items relating to color.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 11 is a table for explaining an example of information concerning color sets in an auto-color function in the preferred embodiment;

DESCRIPTION OF THE PREFERRED EMBODIMENTS

Figure 1A:
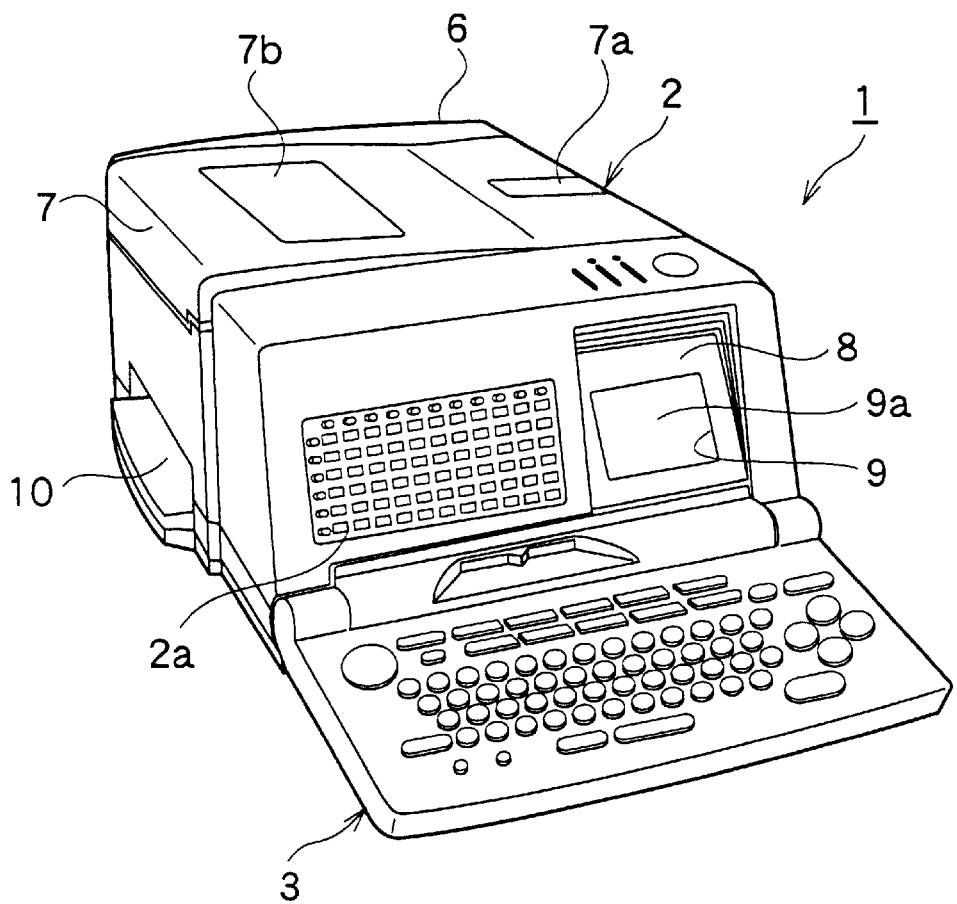
FIGS. 1A and 1B are perspective views of a tape printing apparatus, to which a preferred embodiment of a printing apparatus according to the present invention is applied.

Referring now to the accompanying drawings, a preferred embodiment of a color printing apparatus according to the present invention, which is applied to a tape printing apparatus, will be described below.

As shown in FIG. 1, a tape printing apparatus 1 is designed to color-print desired characters or the like, which have been keyed, on a tape T by the ink-jet system to cut a printed portion out of the tape T to prepare a label.

The tape printing apparatus 1 comprises an apparatus body 2, a keyboard 3 for inputting and editing characters, a tape cartridge 4 (see FIG. 2) for housing therein a tape T serving as a printed medium, and an ink cartridge (see FIG. 2) which is filled with four color inks. The tape cartridge 4 and the ink cartridge 5 are detachably mounted on the apparatus body 2.

Figure 1B:
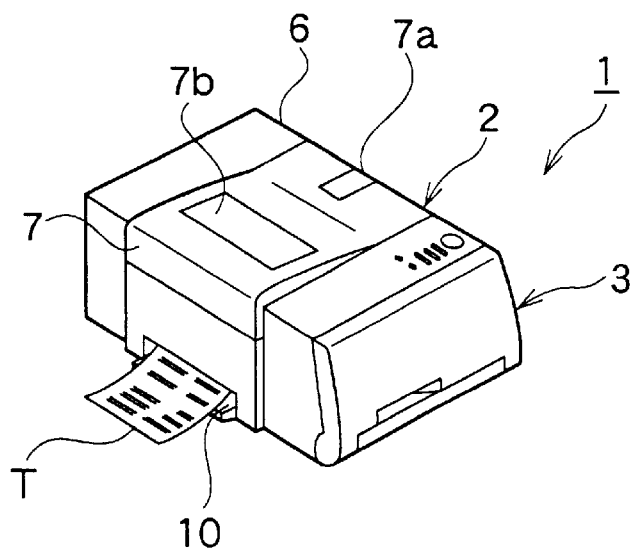

The apparatus body 2 has an apparatus case 6 as an outer frame, and a lid 7 which is provided on the top of an intermediate portion of the apparatus body 6 and which is open and closed when the tape cartridge 4 and the ink cartridge are attached or detached. The lid 7 has transparent windows 7a and 7b for allowing the loaded tape cartridge 4 and ink cartridge 5 to be visible to the naked eye. In the right part on the front side (on the side of the keyboard 3) of the apparatus case 6, there is formed a small window 9 corresponding to an image display part 8 which is built in the apparatus body 2. A transparent panel 9a is built in the small window 9. In addition, in the left part on the front side (on the side of the keyboard 3) of the apparatus case 6, a region 2a capable of sticking a color reference label is ensured (FIG. 1A shows the state that the color reference label is stuck). Moreover, on the side surface (on the left surface in the figure) of the apparatus case 6, a tape exit for feeding the tape T to the outside is formed.

Figure 2:
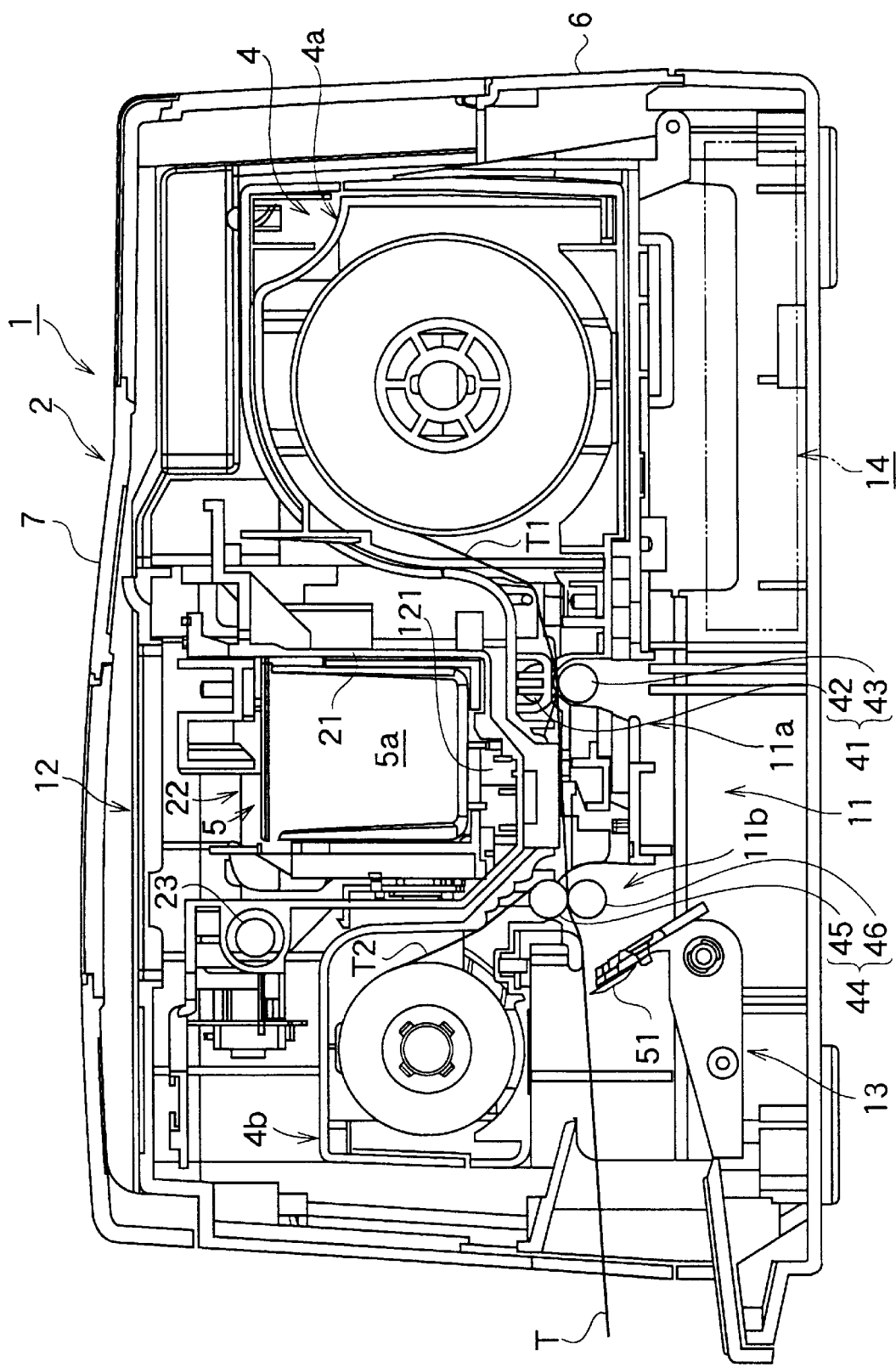
FIG. 2 is a sectional view showing the internal structure of an apparatus body of the tape printing apparatus in the preferred embodiment.

As shown in FIG. 2, the tape cartridge 4 for housing therein the tape T wound onto the tape cartridge 4, a tape feeding part 11 for feeding the tape T to the outside of the apparatus body 2, a printing part 12 for color-printing an image to be printed, a cutting part 13 for cutting the tape T, and a circuit part 14 for controlling the respective parts of the tape printing apparatus 1 are mounted in the apparatus case 6.

The tape cartridge 4 comprises a printed tape T1, on which an image to be printed is printed, and a laminate tape T2 which is stuck on the printed portion of the printed tape T1. The printed tape T1 and the laminate tape T2 are wound onto and housed in a printed tape housing part 4a and a laminate tape housing part 4b, respectively, which are provided on both sides of the printing part 12. The printed tape T1 comprises a base tape, an adhesive layer applied on the reverse surface of the base tape, and a released paper tape mounted on the adhesive layer. On the other hand, the laminate tape T2 comprises a base tape of a transparent film, and an adhesive layer applied on the reverse surface of the base tape. The width of the base tape of the laminate tape T2 is substantially the same as that of the printed tape T1. During printing, the base tape of the laminate tape T2 is stuck on the printed tape T1 so that both side edges thereof are trued up.

As the tape cartridge 4, there are some tape cartridges which house therein only the printed tape T1 and which do not have the laminate tape T2. As the printed tape T1 to be housed in the tape cartridge 4, various printed tapes having different widths are prepared.

The printing part 12 comprises a print head 121 having a large number of ink nozzles (not shown) arranged on the tip thereof, a cartridge holder 21 provided on the upper side of the print head 121, an ink cartridge 5 detachably mounted on the print head 121 via the cartridge holder 21, and a carriage 22, on which the print head 121 and the ink cartridge are mounted. The ink cartridge 5 has an ink tank 5a filled with four color inks of yellow, cyanogen, magenta and black. When the ink cartridge is mounted on the print head 121, the ink tank 5a of the ink cartridge 5 for the respective colors is communicated with the printed head 121 to allow the supply of the inks of the respective colors.

The carriage 22 is slidably mounted on a carriage guiding shaft 23 extending in the lateral directions of the printed tape T1. The carriage 22 is designed to be reciprocated right and left (in the lateral directions of the printed tape T1) by means of a timing belt (not shown) by the reciprocal driving of a carriage motor (CR motor) 122 (see FIG. 5). In addition, the carriage 22 has a projecting shading plate (not shown). When the shading plate faces a position sensor 98 (see FIG. 5) of a photo-interrupter or the like, it is detected that the print head 121 is positioned at a home position (not shown), and a position correction, such as a zero point correction, is carried out. That is, since the home position serves as a waiting position for the print head 121 and as a reference position during printing, it is possible to accurately move the carriage 22 to the respective positions in the lateral directions in a printed rage of the printed tape T1 by rotating the CR motor 122 from the reference position by a predetermined number of steps, so that it is possible to carry out a desired color printing on the surface of the printed tape T1 by driving the print head 121 in synchronism with the movement of the carriage 22.

The tape cartridge 4 is provided with an identification plate (not shown) indicative of identification information by a bit pattern or the like. When the identification sensor 99 (see FIG. 5) mounted on the carriage 22 faces the identification plate, the kind of the tape T and the printing starting position on the printed tape T1 of the tape T are detected.

The tape feeding part 11 has a printed-tape-side feed mechanism 11a and a laminate-tape-side feed mechanism 11b, which are provided on both sides of the print head 121 on the upstream and downstream sides in the feed direction, respectively. The printed-tape-side feed mechanism 11a comprises: a feed roller 41 comprising a feed driven roller 42 and a feed driving roller 43 which are arranged up and down; and a tape feed motor (PF motor) 111 (see FIG. 5) for rotating the feed driving roller 43.

The feed driving roller 43 is provided on the apparatus body 2, and the feed driven roller 42 is provided on the tape cartridge 4. After the tape cartridge 4 is mounted in the apparatus body 2, the feed driven roller 42 causes the printed tape T1 to be nipped between the feed driven roller 42 and the feed driving roller 43 so as to press the printed tape T1 on the feed driving roller 43. When the tape feed motor 111 rotates in this state, the printed tape T1 nipped between the feed driven roller 42 and the feed driving roller 43 is fed forwards.

On the other hand, the laminate-tape-side feed mechanism 11b comprises: a laminate roller 44 comprising a laminate driven roller 45 and a laminate driving roller 46 which are arranged up and down; and a laminate motor (not shown) for rotating the laminate driving roller 46. Furthermore, the laminate motor is the same as the above described tape feed motor (the PF motor 111), and the power thereof is divided by a speed reducing gear train (not shown) to operate the feed roller 41 and the laminate roller 44.

Similar to the above described feed driving roller 43 and feed driven roller 43, the laminate driving roller 46 and the laminate driven roller 45 are provided in the apparatus body 2 and the tape cartridge 4, respectively. After the tape cartridge 4 is mounted in the apparatus body 2, the laminate driven roller 4causes the printed tape T1 and the laminate tape T2 to be nipped between the laminate driven roller 45 and the laminate driving roller 46 so as to press the printed tape T1 and the laminate tape T2 on the laminate driving roller 46. When the laminate motor rotates in this state, the printed tape T1 and the laminate tape T2, which are nipped between the laminate driven roller 45 and the laminate driving roller 46, are fed forwards while being stuck on another.

The cutting part 13 comprises a cutter 51, and a cutter motor 131 (see FIG. 5) for driving the cutter 51. After printing is completed, the tape T is step-fed by a predetermined distance by means of the PF motor 111 to be stopped. Immediately thereafter, the cutter motor 131 is driven to cut the printed portion of the tape T.

The keyboard 3 is mounted on the apparatus body 2 so as to be pivotable between a vertical state and a horizontal state. When the tape printing apparatus 1 is used, the keyboard 3 is in the horizontal state (see FIG. 1A), and when the tape printing apparatus 1 is carried or stored, the keyboard 3 is in the vertical state (see FIG. 1B). Thus, the tape printing apparatus 1 has excellent portability and storability since the whole apparatus is compact when being carried or stored.

Figure 3:
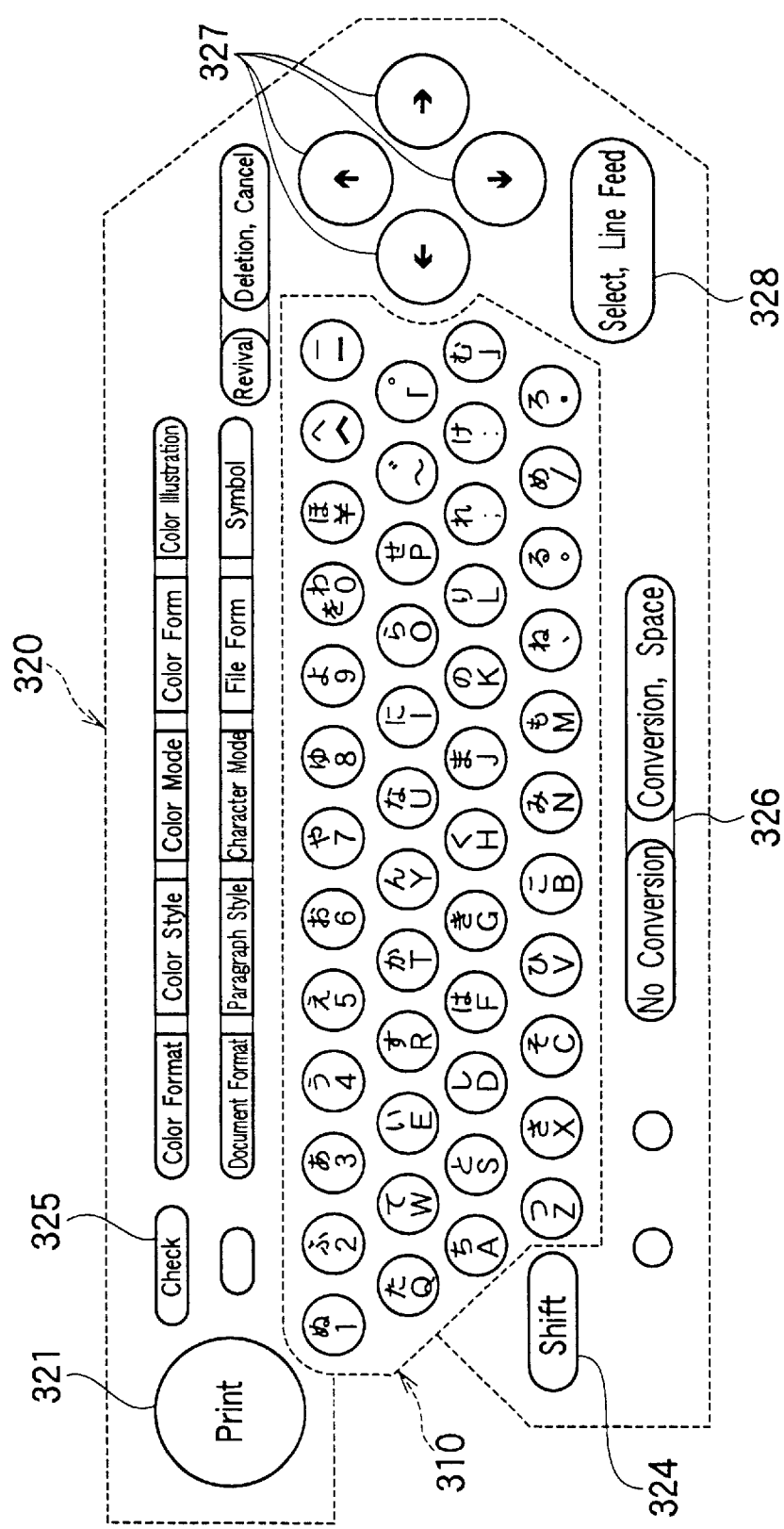
FIG. 3 is a schematic diagram showing the key array of a keyboard in the preferred embodiment.

FIG. 3 shows the key array of the keyboard 3. As shown in FIG. 3, the keyboard 3 is provided with a large number of character keys 3for inputting characters, such as letters and symbols, and a plurality of function keys 320 arranged on the upper, lower and right sides of the character keys 310. Each of the character keys 310 has a circular convex shape.

On the surface and upper side thereof, hiragana characters, alphabets, numeric characters and symbols are described. On the other hand, most of the function keys 320 have a rectangular or elliptic convex shape, and the function of each key and so forth are described on the surface and upper side thereof.

Most of the upper function keys 320 serve to change the operation mode of the tape printing apparatus 1 to any one of various editing modes. Therefore, by depressing these keys, the operation mode can be changed to, e.g., an editing mode for setting the background of an inputted character image or an editing mode for setting the color of characters of the character image. Furthermore, on the left end of the upper row of the function keys 320, a print key 321 for commanding a print operation is arranged.

On the other hand, the lower and right rows of the function keys 320 include keys for converting characters into kanji when the operation mode is an input mode and for selecting a desired one from options when the operation mode is an editing mode. Therefore, for example, when input characters are converted into kanji, the user suitably operates a conversion key 326, a cursor key 327 and a select key 328. Furthermore, a shift key 324 is provided for inputting characters described on the upper side of any one of the character keys 310 or for carrying out the function described on the upper side of any one of the function keys 320, by simultaneously depressing the corresponding one of the character keys 310 and the function keys 320. In addition, reference number 325 denotes a check key for starting the function of displaying the set value of each of the set edited items to check the set value. Furthermore, a power supply key is not provided on the keyboard 3, and it is provided on the front side of the upper surface of the apparatus body 2.

Figure 4:
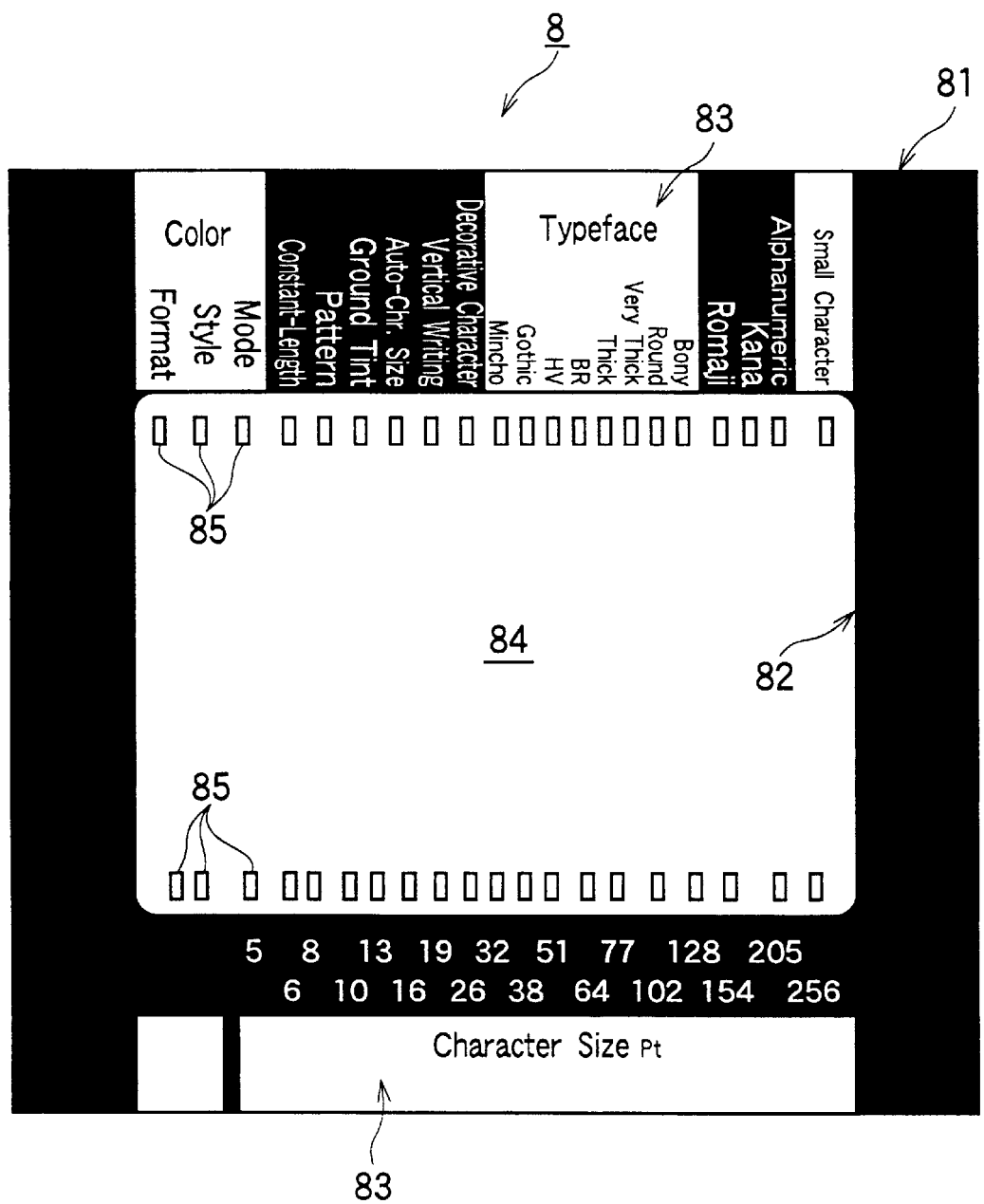
FIG. 4 is an enlarged plan view of an image display part in the preferred embodiment.

FIG. 4 is an enlarged plan view of the image display part 8. The image display part 8 has a display screen 81 for displaying an image of input characters and so forth. The display screen 81 comprises a monochrome liquid crystal display, which comprises: a liquid crystal display part 82 for displaying the image and a plurality of indicators 85, which will be described later, by a liquid crystal; and a mode describing part 83, which is provided around the liquid crystal display part 82 and on which the meaning of each of the indicators 85 has been previously described. On a display part 84 occupying most of the liquid crystal display part 82, an image picture (a print image) for the character image to be printed, and menu and options during the editing of the character image are displayed in addition to the character image. In addition, when the print image is displayed on the liquid crystal display part 82, the image can be displayed by four gradations (four-gradation display).

The tape print apparatus 1 is designed to turn the indicators 85 on to display what contents of the input state (input in romaji (Roman letters), kana or the like) from the keyboard 3, the typeface (Mincho type, Gothic type or the like) for the character image during printing, the print style (the vertical writing, the constant-length print or the like), and the background (the ground tint pattern or the like) for the character image and so forth are set during the use thereof. Therefore, for example, when the input state is the input in romaji, the indicator 85 arranged directly below the "romaji" in the mode describing part 83 is turned on, and when Gothic type is designated as the typeface for the character image, the indicator 85 arranged directly below "Gothic type" in the mode describing part 83 is turned on.

Figure 5:
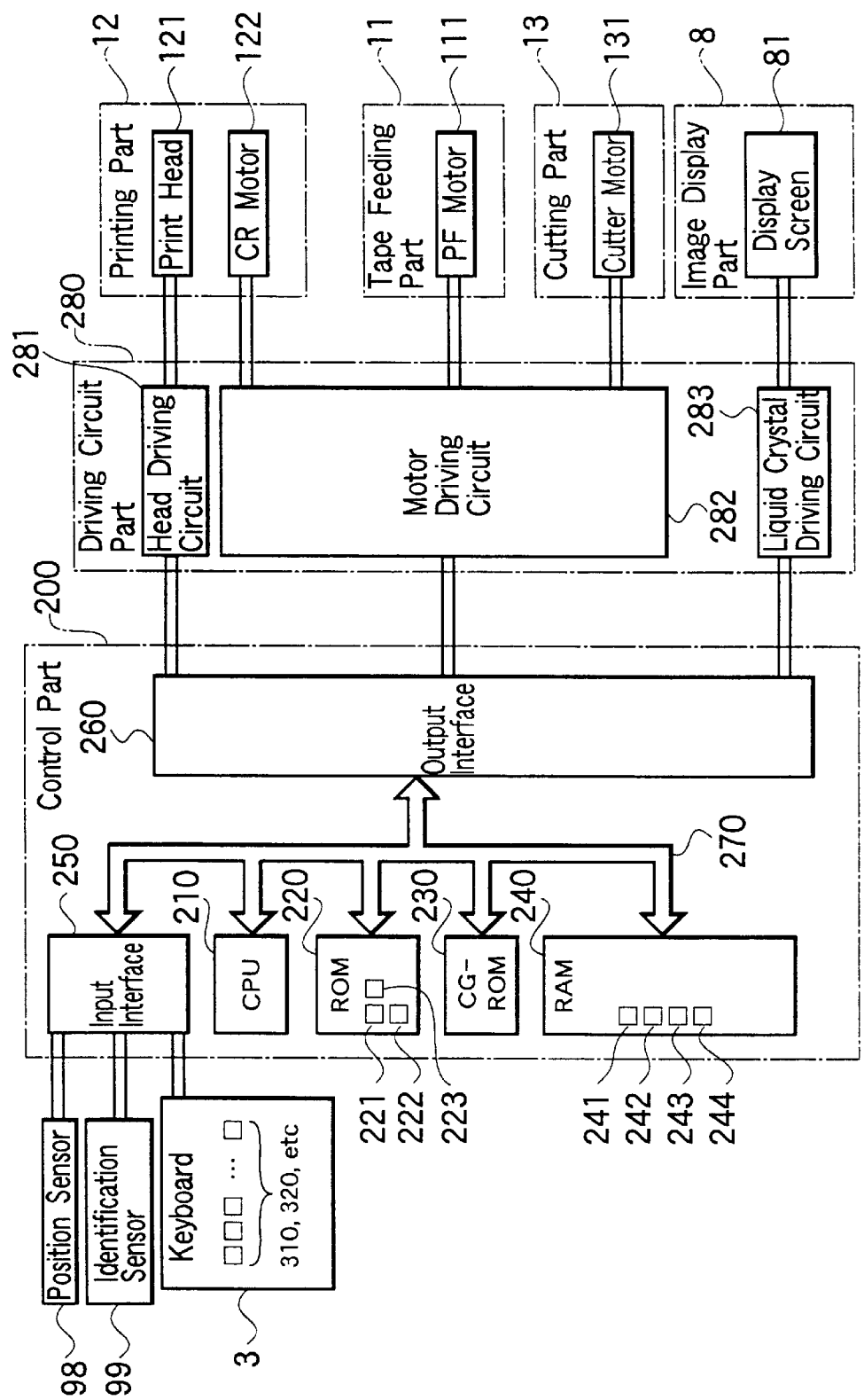
FIG. 5 is a block diagram of a control system of the tape printing apparatus in the preferred embodiment.

Referring to FIG. 5, the basic construction of a control system of the tape printing apparatus 1 will be described below.

As shown in FIG. 5, the control of the tape printing apparatus 1 is executed by a control part 200 in response to input signals from the keyboard 3, the position sensor 98 and the identification sensor 99. The control part 200 is designed to control the printing part 12, the tape feeding part 11, the cutting part 13 and the image display part 8 via a driving circuit part 280.

The control part 200 has a CPU 210, a ROM 220, a character generator ROM (CG-ROM) 230, a RAM 240, an input interface 250 and an output interface 260, which are connected to each other by means of a bus 270.

The ROM 220 has stored therein a color converting table 221, a character modifying table 222 and so forth, in addition to a control program processed by the CPU 210. As the control program, an automatic color designating program 223, which will be described later, is also stored.

The CG-ROM 230 has stored therein font data for characters, such as letters, symbols and figures, which have been prepared in the tape printing apparatus 1. When code data for identifying characters are given, the CG-ROM 230 outputs the corresponding font data.

The RAM 240 has regions for various register groups 241, a text memory 242 for storing text data for characters inputted from the keyboard 3, a display image data memory 243 for storing display image data for the display screen 81, and a printed image data memory 244 for storing printed image data. These regions are used as operation regions for control processing. Furthermore, the RAM 240 is supplied with power supply by a backup power supply circuit (not shown) so that the RAM 240 holds the stored data even if a power supply is turned off.

The input interface 250 is a circuit, which is connected to the keyboard 3, the position sensor 98 and the identification sensor 99, for allowing various command and input data from the keyboard 3, a position detecting signal from the position sensor 98, and an identification information signal from the identification sensor 99, to be incorporated into the bus 270. In addition, the output interface 260 is a circuit for outputting data and control signals, which have been outputted from the CPU 2or the like to the bus 270, to the driving circuit part 280.

The position sensor 98 is designed to detect that the print head 121 reaches the home position to input the detected signal to the control part 200, and the identification sensor 99 is designed to detect the kinds of the tape cartridge 4 and the tape T and a print starting position to input the detected signal to the control part 200.

The driving circuit part 280 comprises a head driving circuit 281, a motor driving circuit 282 and a liquid crystal driving circuit 283. The head driving circuit 281 is designed to drive the print head 121 of the printing part 12 in accordance with a control signal outputted from the control part 200. Similarly, the motor driving circuit 282 is designed to drive the CR motor 122 of the printing part 12, the PF motor 111 of the tape feeding part 11, and the cutter motor 131 of the cutting part 13 in accordance with the indication of the control part 200. Similarly, the liquid crystal display circuit 283 is designed to control the image display part 8 in accordance with the indication of the control part 200.

In the control system with such a construction, the CPU 210 of the control part 200 receives various commands and data from the keyboard 3, the position detecting signal from the position sensor 98, and the identification information signal from the identification sensor 99, via the input interface 250 in accordance with the control program in the ROM 220, and processes the font data from the CG-ROM 230, and various data in the RAM 240 to output control signals to the driving circuit part 280 via the output interface 260. By the control signals, the printing control and the display control for the display screen 81 are carried out, and the print head 121 is controlled to carry out the color printing on the tape T on predetermined printing conditions. Thus, the whole tape printing apparatus 1 is controlled.

Referring to the accompanying drawings, the operating procedure and operation for preparing a label by means of the tape printing apparatus 1 will be described below.

First, when a power supply is turned ON to start the tape printing apparatus 1, an image displayed immediately before the power supply is turned OFF during the last starting is displayed on the display screen 81. That is, even if the power supply is turned OFF in this tape printing apparatus 1, the RAM 240 is designed to store therein data for the last image, together with the editing data thereof, in addition to various set data registered by a user, so that an image based on the data for the image and the editing data is displayed on the display screen 81 immediately after the starting. Furthermore, when the power supply has been turned OFF after all of images, such as inputted characters, are erased in the last starting, or when the tape printing apparatus is first used, only a line head mark (a mark wherein a line number is surrounded by a quadrangle) indicative of a line during printing is displayed on the display part 84 of the display screen 81 as shown in FIG. 6.

Figure 6:
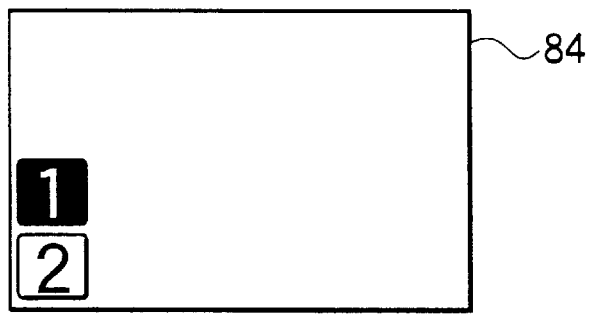
FIG. 6 is a schematic diagram for explaining an initial screen of the display part of the tape printing apparatus in the preferred embodiment.

When only the line head mark shown in FIG. 6 is displayed, a process for inputting a character string "Fragile" to edit the character string in various ways to print the edited character string to prepare a label will be described in due order.

Figure 7:
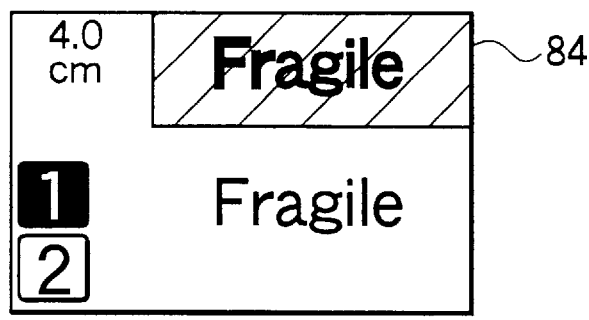
FIG. 7 is a schematic diagram showing the display part in the preferred embodiment when characters are inputted.

FIG. 7 shows the display part 84 immediately after the character string "Fragile" is inputted.

In the tape printing apparatus 1, character input screens include a usual input screen, which uses the whole area of the display part 84 for displaying inputted characters, and an input screen with a print image, which uses a part of the display part 84 for displaying inputted characters and which uses the residual portion of the display part 84 for displaying the print image.

By operating a predetermined function key 320, it is possible to select which input screen is applied. Even if the power supply is turned OFF, information concerning which input screen should be applied is held. FIG. 7 shows an input screen which uses two lines for displaying a printed image and two lines for displaying inputted characters when a character string "Fragile" is inputted.

As shown in FIG. 7, if the character string "Fragile" is inputted, the character string "Fragile", together with its printed image and label length (which will be hereinafter referred to as a "tape length"), which are arranged on the upper half thereof, is displayed on the display part 84.

This printed image is displayed on the display part 84 by allowing the data for the character string "Fragile" to be expanded for the printed image by means of the RAM 240 and outputting its control signal to the liquid crystal driving circuit 283. On the other hand, the tape length is displayed as a value obtained by adding forward and backward margins to a value which is calculated on the basis of the size of each of the characters of "Fragile", the number of the characters and the character gap (i.e. distance between adjacent two of the characters). Furthermore, in the tape printing apparatus 1, the user can set the length of a label in order to make a label having a constant length (a constant-length printing). In this case, the set length is displayed as the tape length.

Although it is possible to make a label by inputting the character string "Fragile" as described above and printing the inputted character string as it is, the tape printing system 1 can edit the inputted characters and so forth in various ways to make an expressive label as user intended. Furthermore, when the character string "Fragile" is printed immediately after it is inputted, a default value is applied to be printed with respect to various edited items.

Edited items will be briefly described below. As units for editing, there are three stages of formats, styles and modes. The formats relate to the whole label. Among the formats, one having no relation to color is called a sentence format, and one relating to color is called a color format. The styles relate to each part (which will be hereinafter referred to as a "paragraph"), which has, e.g., one or more characters wished to have different attributes even if the number of lines is different or the same and which is divided in a longitudinal direction of the label. Among the styles, one having no relation to color is called a paragraph-style, and one relating to color is called a color style. The modes relate to each of characters. Among the modes, one having no relation to color is called a character mode, and one relating to color is called a color mode.

Furthermore, the mode relating to each of characters can be designation of a paragraph or the whole label according to its designation. In addition, the style relating to each of paragraphs can be designation of (the character string of) the whole label according to its designation.

The edited items belonging to the document format include (1) a ground tint attribute relating to the selection of the kind of a background pattern (a ground tint), (2) a ground tint pattern attribute relating to the size of a ground tint, (3) a constant-length printing attribute relating to the selection of a length in the constant-length printing, (4) a justification attribute relating to the arrangement of each of characters in the constant-length printed label (front justification, centering, equal space, rear justification), (5) a margin attribute relating to the amount of margins provided on the front and rear sides in a longitudinal direction of a label, and so forth.

The edited items belonging to the color format include (1) a background color attribute for defining the color of the background, (2) a ground tint color attribute for defining the color of the ground tint, and so forth.

The edited items belonging to the paragraph style include (1) a character size attribute relating to (the combination of) the character size on each line, (2) an alignment attribute relating to how to arrange character strings on each line (front-aligned, centering, equal space, rear-aligned), (3) an outer frame/tabular work attribute relating to the application of a frame for paragraphs and of lines constituting a table, and so forth.

The edited items belonging to the color style include (1) a closing-line color attribute defining the color of closing lines (lines constituting the above described frame or table) when a document has the closing lines, (2) an intraframe color attribute defining the color in an outer frame (including an outer peripheral frame in the case of a tabular work) when a paragraph has the outer frame, and so forth.

The edited items belonging to the character mode includes (1) a vertical/horizontal attribute defining whether a character serving as an object should be vertically or horizontally written, (2) a Japanese character typeface attribute defining the Japanese character typeface for a character serving as an object, (3) an alphanumeric character typeface attribute defining the alphanumeric character typeface for a character serving as an object, (4) a decorative character attribute defining the modification for a character serving as an object (outline character; shadow character, italic character, highlighted character, etc.), (5) an expansion/contraction attribute defining whether a character serving as an object should be expanded or contracted from the basic character size on a line, to which the character belongs, (6) an arrangement attribute defining whether the expanded or contracted character should be arranged at the same position as, below or above the basic position on the line, (7) an enclosing/meshing attribute defining whether the enclosing or half-tone dot meshing should be applied to a character serving as an object, (8) a character gap attribute defining a gap between a character serving as an object and the next character, (9) a pitch attribute defining whether the character gap should be automatically determined or fixed, and so forth.

The edited items belonging to the color mode include (1) a character color attribute defining the color of a character serving as an object, (2) an outline color attribute defining the color of the outline of a character when the character includes the outline, (3) a character shadow color attribute defining the color of the shadow of a character when the character has the shadow, (4) an enclosing line color attribute defining the color of the enclosing line of a character when the character has the enclosing line, (5) an intra-enclosure color attribute defining the color in the enclosure of a character when the character has the enclosure, (6) a half-tone dot meshing color attribute defining the color of the half-tone dot meshing of a character when the character has the half-tone dot meshing, and so forth.

As described above, since there are a wide range of edited items having an influence on the printing processing. Therefore, the tape printing apparatus 1 does not have an editing mode every edited item, and have six kinds of inclusive editing modes, such as a document format editing mode, a color format editing mode, a paragraph style editing mode, a color style editing mode, a character mode editing mode and a color mode editing mode.

A process for setting and updating edited items belonging to the color format as an-example will be briefly described below.

In order to set or update edited items belonging to the color format, the user operates a predetermined function key 320 for starting the editing processing for the color format to change the operation mode from the input mode to the color format editing mode. At this time, the CPU 210 starts to execute a color format editing program (not shown) to cause an editing screen for the color format editing mode to be displayed on the display part 84.

Figure 8:
FIG. 8 is a schematic diagram for explaining an example of an editing screen for setting a background color in the preferred embodiment.

As the initial editing screen (an editing screen in a first hierarchy), an editing screen including names of edited items belonging to the color format as first hierarchy options is displayed. That is, an editing screen including the names of the above described background color attribute and ground tint attribute is displayed (the title of this screen is, e.g., "color format"). Then, the user suitably operates the cursor key 327 to set the cursor at the name of a desired attribute to depress the select key 328, so that an editing screen in a second hierarchy for concretely designating a color is displayed. Then, the user suitably operates the cursor key 327 to set the cursor at a desired color (option) to depress the select key 328. If necessary, the color setting for other edited items belonging to the color format (attribute) is carried out by the same operation. FIG. 8 shows an example of an edited screen in the second hierarchy concerning the background color attribute (the title of this screen is "background color"). In this example, the cursor is positioned at "blue".

After the color setting for the edited item belonging to the color format (attribute) is completed, the CPU 210 causes the display screen to return to the screen for inputting character strings. In addition, the CPU 210 determines whether it is required to change the indicator 85 by the current setting of the edited item for the color format. If necessary, the CPU 210 changes the indicator 85, ends the color format editing program, and changes the operation mode from the color format editing mode to the input mode.

The processing for editing the color format has been described above. The processing for editing the document format, the processing for editing the paragraph style, the processing for editing the character mode, the processing for editing the color style, and the processing for editing the color mode are carried out substantially in the same manner.

As described above, the user can designate an optional *color of a printed image by separately setting each of edited items in each of editing modes of the color format, color style and color mode.

The tape printing apparatus 1 prepares a plurality of combinations of colors (which will be hereinafter referred to as color sets), such as background and character colors, to allow colors to be designated by selecting one of the color sets. Such a function is called "automatic color designating function". The automatic color designating function includes an "auto-color function", a "color form function" and a "special color form function".

Figure 9:
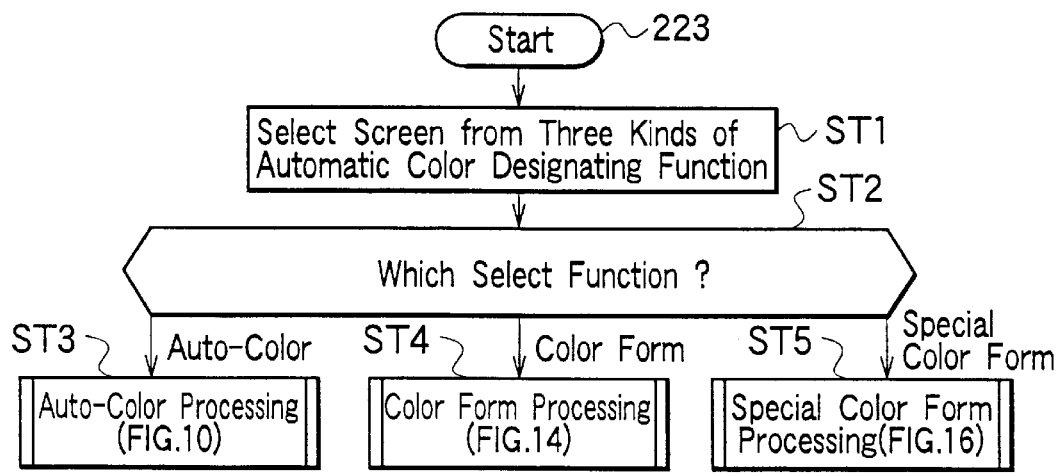
FIG. 9 is a flowchart showing an automatic color designating processing in the preferred embodiment.

When the operation mode is the input mode and when the input screen is displayed, if the user operates the function key 320 relating to the automatic color designating function, the CPU 210 starts to execute the automatic color designating program 223 shown in FIG. 9. Furthermore, this operation of the function key 320 is ignored when an undefined character exists on the input screen. In addition, if the input screen is displayed, this operation of the function key 320 is accepted as an effective operation even if no character is inputted.

Figure 10:
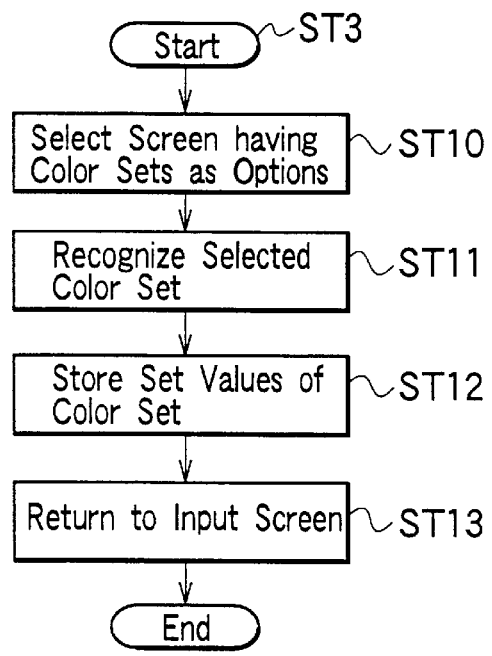
FIG. 10 is a flowchart showing the details of the auto-color processing of FIG. 9.
Figure 14:
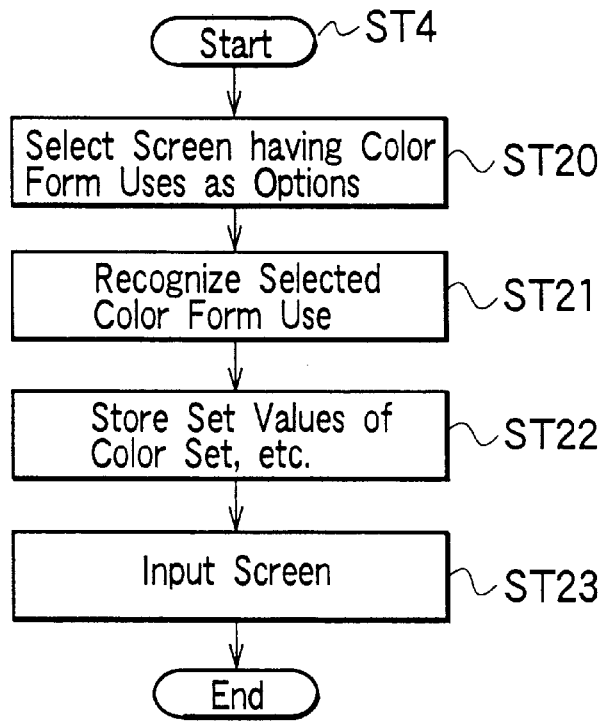
FIG. 14 is a flowchart showing the details of the color form processing of FIG. 9.
Figure 16:
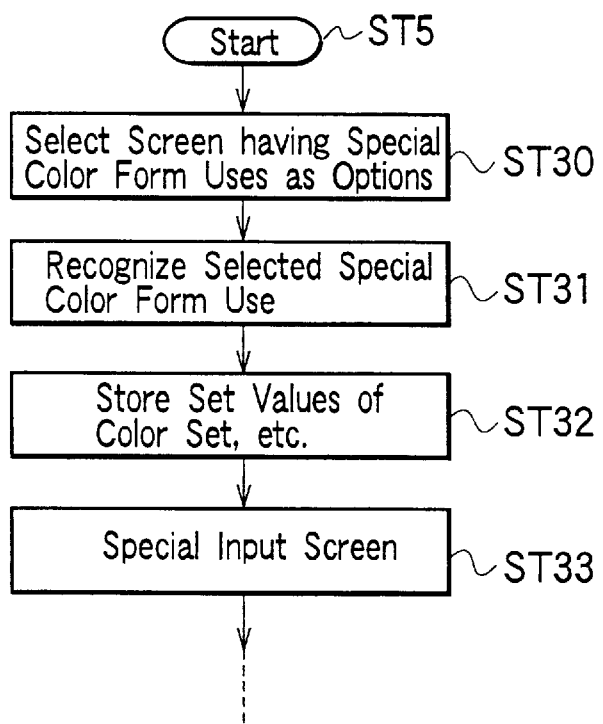
FIG. 16 is a flowchart showing the details of the special color form processing of FIG. 9.

When the execution of the automatic color designating program 223 starts, a select screen (a select screen in the first hierarchy) including "auto-color", "color form" and "special color form" as options is displayed (step ST1). Then, the option is determined (step ST2). While the cursor is positioned at the "auto-color" by operating the cursor key 327 or the like, if the "auto-color" is selected by operating the select key 328, the processing for setting edited items by the auto-color function, the details of which are shown in FIG. 10, is executed (step ST3). While the cursor is positioned at the "color form", if the "color form" is selected by operating the select key 328, the processing for setting edited items by the color form function, the details of which are shown in FIG. 14, is executed (step ST4). While the cursor is positioned at the "special color form", if the "special color form" is selected by operating the select key 328, the processing for setting edited items by the special form function, the details of which are shown in FIG. 16, is executed (step ST5).

Figure 12:
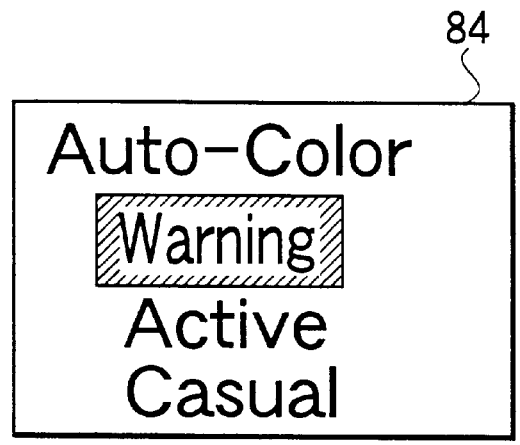
FIG. 12 is a schematic diagram for explaining an example of a screen for selecting a color set in an auto-color in the preferred embodiment.

In the processing for setting edited items by the auto-color function shown in FIG. 10, a select screen (a select screen in the second hierarchy) including identification names "warning", "active", . . . , "monotone", each of which defines a corresponding one of color sets assigned as shown in, e.g., FIG. 11, as options is displayed (step ST10) to allow the user to select any one of the options (step ST11). FIG. 12 shows an example of a select screen in the second hierarchy relating to the auto-color (the title is "auto-color"). In this example, the cursor (inverted display) is assigned to the option "warning".

Figure 13:
FIG. 13 is a schematic diagram for explaining an example of a printed result in a certain color set in the preferred embodiment.

As shown in FIG. 11, the identification name defining each of the color sets directly indicates the image of the color set. In addition, the color sets assign the set values for all of the edited items belonging to the color format, the color style and the color mode. For example, a color set, to which the identification name "warning" is assigned, defines the background color, the intraframe color and the intra-enclosure color as "yellow" indicating the image of the color of warning, and other colors of characters and so forth as "black". In addition, for example, a color set, to which the identification name "monotone" is assigned, is a color set of combination of "black", "gray" and "white". FIG. 13 shows the printed result of the color set, to which the identification name "monotone" is assigned (the character string is "monotone"). The above described information shown in FIG. 11 is stored in, e.g., the ROM 220.

Furthermore, if the number of the color sets in the auto-color function prepared by the tape printing apparatus 1 is great, the select screen at step ST10 is suitably scrolled or changed to a select screen including a plurality of identification names of different color sets, by operating the cursor key 327 (see FIG. 12).

While the cursor is positioned at the identification name of any one of the color sets, if any one of the color sets is selected by operating the select key (the above described step ST11), the CPU 210 stores the set values for the edited items belonging to the color format, the color style and the color mode for the color set with respect to the whole inputted character string (step ST12). That is, the CPU 210 stores the set values for the selected color in place of the set values for the edited items belonging to the color format, the color style and the color mode before the operation of the function key 320 relating to the automatic color designating function. Thereafter, the CPU 210 causes the display screen to return to the input screen for characters (step ST13), and ends the automatic color designating program 223.

Furthermore, each of the set values for the edited items belonging to the color format, the color style and the color mode, which have been set by such an auto-color function, can also be changed by the above described separate editing mode for the color format, the color style and the color mode.

In addition, when an option (a color set) is selected on the select screen in the second hierarchy, the set values for the edited items belonging to the color format, the color style and the color mode for the color set may not be stored unless the select key 328 is operated while the screen in the third hierarchy is displayed after the set values (set colors) for the color set are displayed on the screen in the third hierarchy so that, e.g., the background color is "yellow", and the ground tint color is "black", to allow the user to confirm the displayed set values, although this is different from the above described processing.

Figure 15:
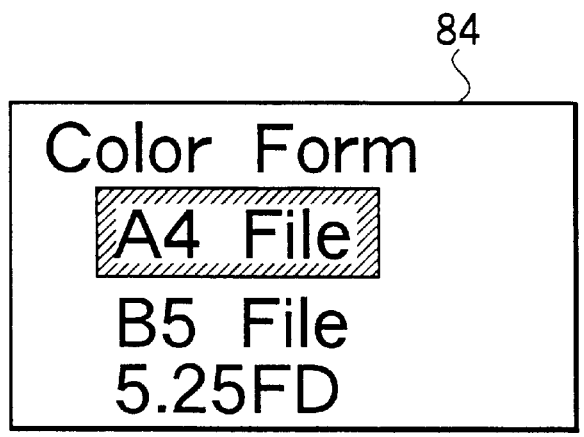
FIG. 15 is a schematic diagram for explaining an example of a screen for selecting a use in a special color form in the preferred embodiment.

In the processing for setting the edited items for the color form shown in FIG. 14, a select screen (a select screen in the second hierarchy) including, as options, names of uses, which are guessed to have many opportunities of being prepared as a label and which have a relatively great degree of freedom for the number and content of characters contained in the printed image, e.g., names of uses for A4 file, B5 file, VHS cassette tape, calling attention, 8 mm video tape, and 3.5-inch floppy disk (step ST20), is displayed to allow the user to select any one of the options (step ST21). FIG. 15 shows an example of a select screen in the second hierarchy relating to the color form (title is "color form"). In this example, the cursor (inverted display) is assigned to the option "A4 file".

With respect to each of the uses serving as the options in the second hierarchy for the color form, the color sets relating to the color format, the color style and the color mode are not only defined, but the set values (not shown) for the edited items belonging to the document format, the paragraph style and the character mode are also defined. The defined information is stored in, e.g., the ROM 220. For example, in the cases of the use for the VHS cassette tape, the set values for edited items, such as the size (constant-print item or the like) of a label intended to be used for a VHS cassette tape, and the character size, which have no relation to color, are also defined in addition to the color sets.

Furthermore, if there are a large number of uses for the color form prepared by the tape printing apparatus 1, the select screen at step ST20 is suitably scrolled or changed to a select screen including a plurality of names of different color form uses, by operating the cursor key 327.

While the cursor is positioned at any one of the names (options) of the uses for the color form, if any one of the uses is selected by operating the select key (the above described step ST21), the CPU 210 stores the set values (color sets) for the edited items belonging to the color format, the color style and the color mode, the uses of which have been defined, and the set values for the edited items belonging to the document format, the paragraph style and the character mode, so as to correspond to character strings which will be inputted (step ST22). That is, the CPU 210 stores the set values for the selected use in place of the set values for the edited items belonging to the color format, the color style, the color mode, the document format, the paragraph style and the character mode before the operation of the function key 320 relating to the automatic color designating function. Thereafter, the CPU 210 causes the input screen for characters to be displayed (step ST23), and ends the automatic color designating program 223.

In the display on the input screen at step ST23, even if there are characters inputted before the operation of the function key 320 relating to the automatic color designating function, the characters are deleted. In addition, on the input screen during this return, marks for guiding the position of a picture character to be inputted and the position of a letter character to be inputted are also displayed according to the selected use so as to facilitate the input of characters meeting the use.

Furthermore, each of the set values for the edited items belonging to the color format, the color style and the color mode, which have been set by such a color form function, can be changed later by the separate editing mode for the color format, the color style and the color mode. In addition, each of the set values can be collectively changed later by the auto-color function.

In addition, when an option (a use) is selected on the select screen in the second hierarchy, the set values for the use may not be stored to display the input screen unless the select key 328 is operated while the screen in the third hierarchy is displayed after the set values for the edited items belonging to the color format, the color style, the color mode, the document format, the paragraph style and the character mode are displayed on the screen in the third hierarchy to allow the user to confirm the displayed set values, although this is different from the above described processing.

Moreover, the tape printing apparatus 1 preferably prepares a form function which does not have the function of setting the edited items belonging to the color format, the color style and the color mode and which has only the function of setting the edited items belonging to the document format, the paragraph style and the character mode, although this is not described in detail. In the case of such a form function, it is possible to separately set the edited items relating to color, or it is possible to collectively set the edited items relating to color by utilizing the auto-color function.

According to the above described color form function, it is possible to automatically set a color set suitable for the use of a form input while utilizing the form input.

Figure 17:
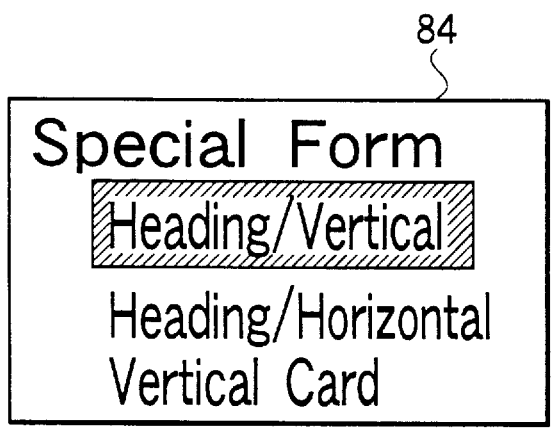
FIG. 17 is a schematic diagram for explaining an example of a screen for selecting a use in the special color form in the preferred embodiment.

In the processing for setting the edited items for the special color form shown in FIG. 16, a select screen (a select screen in the second hierarchy) including, as options, names of uses, which are guessed to have many opportunities of being prepared as a label and which have a small degree of freedom for the number and content of characters contained in the printed image, e.g., names of uses for a heading, a post card and a card, is displayed (step ST30) to allow the user to select any one of the options (step ST31). FIG. 17 shows an example of a select screen in the second hierarchy relating to the special color form (title is "special form"). In this example, the cursor (inverted display) is assigned to the option "heading/vertical".

With respect to each of the uses serving as the options in the second hierarchy for the special color form, the color sets relating to the color format, the color style and the color mode are not only defined, but the set values (not shown) for the edited items belonging to the document format, the paragraph style and the character mode are also defined. The defined information is stored in, e.g., the ROM 220. Moreover, the positions of characters to be printed and the maximum number of characters are also defined.

Furthermore, if there are a large number of uses for the special color form prepared by the tape printing apparatus 1, the select screen at step ST30 is suitably scrolled or changed to a select screen including a plurality of names of different special color form uses, by operating the cursor key 327.

While the cursor is positioned at any one of the names (options) of the uses for the special color form, if any one of the uses is selected by operating the select key (the above described step ST31), the CPU 210 stores the set values (color sets) for the edited items belonging to the color format, the color style and the color mode, the uses of which have been defined, and the set values for the edited items belonging to the document format, the paragraph style and the character mode, so as to correspond to character strings which will be inputted (step ST32). That is, the CPU 210 stores the set values for the selected use in place of the set values for the edited items belonging to the color format, the color style, the color mode, the document format, the paragraph style and the character mode before the operation of the function key 320 relating to the automatic color designating function. Thereafter, the CPU 210 causes a special character input screen to be displayed (step ST33), and causes to carry out a character input processing using the special character input screen. Furthermore, steps after step ST33 are omitted from FIG. 16.

The special character input screen displayed at step ST33 is different every selected use. For example, if the use "post card" is selected, a dedicated input screen for inputting an address is first displayed. If an address is inputted, a dedicated input screen for inputting a name (or a full name) is displayed. Thereafter, similarly, the input screen is sequentially changed so as to allow the user to input required character strings.

If characters for the minimum number of items necessary to allow print are inputted, the CPU accepts the command for the user to print or display a print image using the whole display part 84. Also after the print or the display of the print image using the whole display part 84 is completed, the CPU causes the screen to return to the special character input screen. Furthermore, the return from the special character input screen to the usual input screen is carried out by operating the cancel key several times.

Furthermore, the special character input screen accepts only a part of the character mode and a part of the color mode as changeable editing modes.

According to the above described special color form function, it is possible to automatically set a color set suitable for the use of a form input while utilizing the form input.

According to the above described auto-color function, it is possible to set a color set before or after a character string is inputted. In addition, according to the color form input function, it is possible to automatically set various edited items, and thereafter, it is possible to input required characters. Thus, if information concerning the character string and edited items necessary for print is prepared (except for the case of the special color form function), print may be directly indicated. However, print may be commanded after the contents of print are verified by utilizing the following verifying function.

As the verifying function, there is a check display function of allowing the batch or gradual display of set-value information (printed information) based on the edited contents, on the display part 84 of the display screen 81 to allow the verification of the set-value information based on the edited contents. There is also a preview display function of allowing the display and simple verification of the print image of the whole label on the display part 84.

If the user verifies the edited contents and the print image of the whole label by the above described check function and preview display function, the user operates the print key 321 to command print. At this time, a printed image (a composite image of a background image and a character image) reflecting the set values by editing is printed on the print tape T1, and the laminate tape T2 is stuck on the printed portion. Thereafter, the printed portion of the tape T is discharged from the tape exit to the outside to be cut by the cutting part 13 to complete a label.

As described above, according to this preferred embodiment, since the auto-color function of collectively setting edited items relating to color, the setting of a color set for a printed image can be simple. Since the identification names are assigned to color sets to select one of the color sets, it is possible to grasp the combination of colors as an image to select the combination of colors, so that the selecting operation is easy. In addition, since it is possible to separately change the color setting for a part of edited items even if a color set is selected by the auto-color function, it is easier to obtain a printed image of a user's desired color. Moreover, the setting of a color set using the auto-color function may be carried out both before and after the input of a character string, so that the user can set a color set in an optional timing.

In addition, since the edited items relating to color can be collectively automatically set also in the form input function (the color form function and the special color form function)

taking account of the use of a label, the setting operation of a color set for a printed image can be simple.

Furthermore, the edited items relating to color should not be limited to the above described preferred embodiment. For example, if the tape printing apparatus can not cope with shadow characters, it is not required to provide the edited item being the character shadow color. In addition, if the intra-enclosure color is set to be a background color without being defined, it is not required to provide the edited item being the intra-enclosure color.

While the auto-color function has carried out the automatic setting for all of edited items relating to color, the auto-color function may carry out the automatic setting for a plurality of edited items relating to basic colors, such as a character color and a background color.

Moreover, while information (e.g., color sets) capable of being selected by the auto-color function or the like has been prepared by the system in the above described preferred embodiment, the information may be optionally registered and deleted by the user in addition to or in place of this. In addition, such a function of allowing the user to edit may be limited to the auto-color function, or the edited items may include the color form and the special color form.

Figure 18:
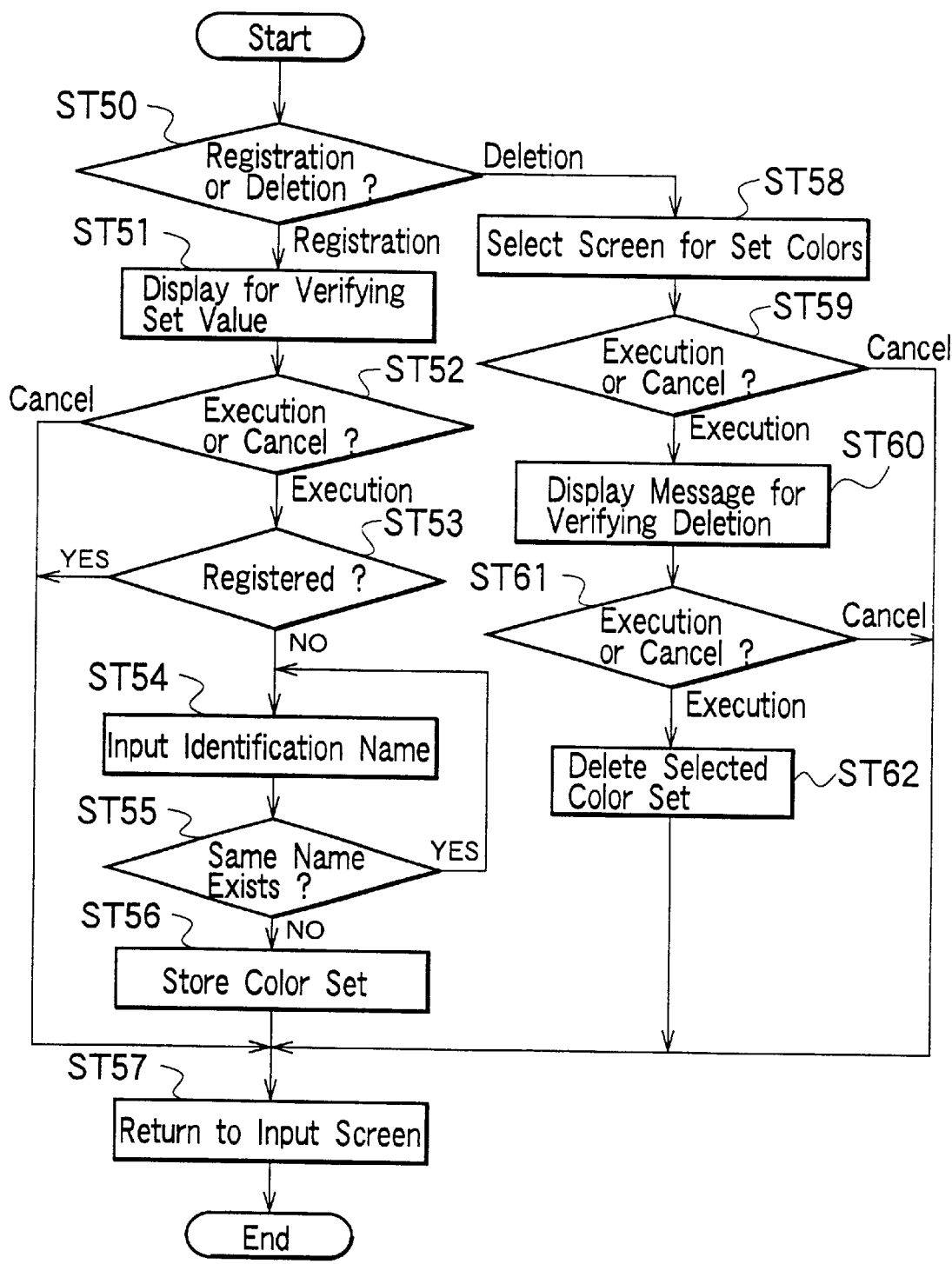
FIG. 18 is a flowchart showing a color set registering/deleting processing in another preferred embodiment.

FIG. 18 is a flowchart showing a process for allowing a user to register or delete a color set, which can be selected by the auto-color function, in another preferred embodiment.

If a predetermined function key 320 for starting the registration or deletion of a color set is operated while a character input screen is displayed, the CPU 210 starts the processing shown in FIG. 18 to determine whether the registration or deletion has been indicated (step ST50).

If the registration has been indicated, the CPU 210 causes the user to confirm the set values for all of edited items relating to color concerning the input character string on the last character input screen, by the automatic scroll display or by the scroll display according to the user's key operation (step ST51), and thereafter, determines whether execution or cancel is indicated (step ST52).

If cancel is indicated, the CPU 210 causes the display screen to return to the input screen for character strings (step ST57). On the other hand, if execution is indicated, the CPU 210 determines whether the same color set as the set values (the color set to be registered) for all of the edited items relating to the color, which has been set in relation to the character string on the input screen immediately before this processing, has been registered (step ST53). The registered color sets to be compared in this processing include color sets registered by the user, as well as color sets fixedly prepared by the apparatus. If the same color set as a color set intended to be registered has been registered, the CPU 210 gives a warning about it (not shown), and causes the display screen to return to the input screen for character strings (step ST57).

If the same color set as a color set intended to be registered has not been registered, the CPU 210 allows the user to input an identification name assigned to the color set (step ST54), and determines whether the inputted identification name is the same as the existing identification name (step ST55). If the inputted identification name is the same as the existing identification name, the CPU 210 causes the user to input another identification name (step ST54). On the other hand, if a new identification name is inputted, the CPU 210 assigns the inputted identification name to the color set intended to be registered, to store (register) the assigned name in the RAM 240 (step ST56), and then, causes the screen to return to the input screen for character strings (step ST57).

If it is determined at the above described step ST50 that deletion has been indicated, the CPU 210 causes a select screen having the identification name of the color set having been registered, to be displayed to allow the user to select the color set intended to be deleted (step ST58). The color set, the identification name of which is displayed herein, has been registered by the user, and the color set fixedly possessed by the apparatus is not displayed.

Thereafter, the CPU 210 determines whether the deletion has been executed or cancel has been indicated (step ST59). If cancel has been indicated, the CPU 210 causes the screen to return to the input screen for character strings (step ST57). On the other hand, if the deletion has been executed, the CPU 210 causes the screen to display a final confirmation message indicating whether deletion may be executed (step ST60), and then, determines whether execution or cancel is indicated (step ST61). If cancel is indicated in response to the final confirmation message, the CPU 210 causes the screen to return to the input screen for character strings (step ST57). If execution is indicated in response to the final confirmation message, the CPU 210 deletes the color set, to which the identification name selected at step ST58 has been assigned, from the RAM 240 (step ST62), and causes the screen to return the input screen for character strings (step ST57)

Furthermore, in the processing for registering the color form and/or the special color form, information concerning the number of lines of character strings, the character size thereof and so forth on the character-string input screen immediately before the registration is indicated, is registered in addition to color sets.

While the tape printing apparatus in the above described preferred embodiment has been equipped with means for inputting a printed image (a character image and a background image), the tape printing apparatus may be applicable to the transfer of a printed image inputted by a personal computer or the like. In this case, the personal computer or the like constitutes the input means of the tape printing apparatus. In addition, the apparatus for carrying out print may be an apparatus which does not have complete input means.

In addition, in the above described preferred embodiment, while the present invention has been applied to the tape printing apparatus, the invention may be applied to a word processor or the like.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A color printing apparatus for printing a printed image of a composite image comprising a color-printable background image and a color-printable character image superposed on said background image, said color printing apparatus comprising:

color-set storing means previously having stored a plurality of sets of combinations of set values for a plurality of edited items relating to the color of said printed image, each plurality of edited items in each set including at least a color of said background image and a color of said character image; and automatic color-set setting means for allowing a user to select any one of said sets of combinations of set values, and for storing the set values of the selected set along with said printed image so that the stored set values are rewritable by separately setting said edited items relating to the color of said printed image.

2. A color printing apparatus according to claim 1, which further comprises color-set editing means for newly storing in said color-set storing means an additional set of combination of set values for said plurality of edited items relating to the color of said printed image or for deleting any one of said plurality of sets of combinations of set values for said plurality of edited items relating to the color of said printed image.

3. A color printing apparatus for printing a printed image of a composite image comprising a color-printable background image and a color-printable character image superposed on said background image, said color printing apparatus comprising,:

color-set storing means previously having stored a plurality of sets of combinations of set values for a plurality of edited items relating to the color of said printed image; and automatic color-set setting means for allowing a user to select any one of said combinations of set values, and for storing the set values of the selected combination along with said printed image so that the stored set values are rewritable by separately setting said edited items relating to the color of said printed image; wherein said automatic color-set setting means shows names, each of which identifies a corresponding one of a plurality of sets of combinations of set values for a plurality of edited items and each of which are associated with said corresponding one, to allow the user to select any one of said combinations.

4. A color printing apparatus for printing a printed image of a composite image comprising a color-printable background image and a color-printable character image superposed on said background image, said color printing apparatus comprising:

form inputting means for allowing a user to form input a character string in accordance with a selected use;

color-set storing means having stored a plurality of combinations of set values for a plurality of edited items relating to the color of said printed image for said selected use, with respect to a plurality of uses relating to a form input, each plurality of edited items in each combination including at least a color of said background image and a color of said character image; and automatic color-set setting means during a form input for storing the set values of one corresponding combination for a plurality of edited items relating to the color of said printed image for said selected use, along with said printed image so that the stored set values are rewritable by separately setting a part or all of said edited items relating to the color of said printed image.

5. A color printing apparatus according to claim 4, which further comprises color-set editing means for newly storing in said color-set storing means an additional combination of set values for said plurality of edited items relating to the color of said printed image or for deleting any one of said plurality of sets of combinations of set values for said plurality of edited items relating to the color of said printed image, during the form input.

\* \* \* \* \*